US008640908B2

(12) United States Patent
Yang et al.

(10) Patent No.: US 8,640,908 B2
(45) Date of Patent: Feb. 4, 2014

(54) SLOW COOKER

(75) Inventors: Guoqing Yang, Foshan (CN); Jinshui Wu, Foshan (CN); Pingtao Chen, Foshan (CN)

(73) Assignee: Midea Group Co., Ltd., Foshan, Guangdong Province (CN)

( * ) Notice: Subject to any disclaimer, the term of this patent is extended or adjusted under 35 U.S.C. 154(b) by 0 days.

(21) Appl. No.: 13/587,925

(22) Filed: Aug. 17, 2012

(65) Prior Publication Data
US 2013/0043253 A1 Feb. 21, 2013

(30) Foreign Application Priority Data

Aug. 19, 2011 (CN) ........................ 2011 2 0302019 U

(51) Int. Cl.
*A47J 27/08* (2006.01)
*B65D 45/16* (2006.01)
(52) U.S. Cl.
CPC ............. *A47J 27/0804* (2013.01); *B65D 45/16* (2013.01)
USPC ........................................ 220/573.1; 220/326
(58) Field of Classification Search
CPC ......... A47J 36/10; A47J 36/06; A47J 37/101; A47J 37/128; A47J 27/0815; A47J 27/0804; B65D 45/16
USPC ........... 220/573.4, 573.1, 912, 326, 324, 315, 220/212.5, 212; 292/256.5, 256; 99/327, 99/332, 339
See application file for complete search history.

(56) References Cited

U.S. PATENT DOCUMENTS

| 4,617,452 A * | 10/1986 | Miwa .............................. 219/441 |
| 5,251,542 A * | 10/1993 | Itoh et al. ........................ 99/403 |
| 5,549,039 A * | 8/1996 | Ito et al. .......................... 99/340 |
| 5,632,403 A * | 5/1997 | Deng ......................... 220/573.4 |
| 6,102,238 A * | 8/2000 | Brady et al. .................. 220/315 |
| 2007/0210061 A1 | 9/2007 | Tynes et al. |
| 2012/0193364 A1* | 8/2012 | Zhong et al. ................ 220/573.1 |
| 2012/0223067 A1* | 9/2012 | Gaynor et al. ................ 219/438 |

FOREIGN PATENT DOCUMENTS

| CN | 201542396 U | 8/2010 |
| CN | 101036559 B | 12/2010 |

* cited by examiner

*Primary Examiner* — Robert J Hicks
(74) *Attorney, Agent, or Firm* — Finnegan, Henderson, Farabow, Garrett & Dunner, LLP

(57) ABSTRACT

A slow cooker is provided which comprises a cooking body having a hollow cavity, a liner container received in the hollow cavity, a lid selectively engageable with the liner container, and a locking assembly for locking the lid with the cooking body. The locking assembly is hinged at one side of the cooking body at one end and selectively engaged with an opposite side of the cooking body at the other end, with the locking assembly being disposed above the lid.

11 Claims, 5 Drawing Sheets

SLOW COOKER

CROSS-REFERENCE TO RELATED APPLICATION

The present application claims benefit from Chinese utility model application No. 201120302019.3 filed on Aug. 19, 2011 by Midea Group Co., Ltd. The entire disclosure of the application is hereby incorporated herein by reference.

FIELD OF THE INVENTION

The present invention relates to a slow cooker and, in particular, to a slow cooker that is capable of preventing spillage of cooking content such as soup.

BACKGROUND OF THE INVENTION

Conventional slow cooker comprises a liner container and a lid disposed on the top rim of the container. The lid is typically not securely engaged with the container. The user is likely to move the cooker or the liner container containing food after the food is well cooked. The lid tends to slide off during movement because there is no secure connection between the liner container and the lid. Furthermore, the shaking caused by the movement can possibly cause spillage of the liquid content in the container, and thus may burn the user.

Chinese patent No. CN 200920198406.X discloses a slow cooker having a touch control panel, which comprises a working pot covered by a lid. A handle comprised of an upper part and a lower part is symmetrically fixed near the top edge of working pot. A spring hole is arranged in the middle of the lower part for accommodating a spring and a steel bead. A latch is slidably arranged between the upper and lower parts, and the movement of the latch is limited by the steel bead. A closed sealing ring, made of silicon gel, is arranged below the periphery of the lid to achieve seal connection between the lid and the working pot. The latch provided between the working pot and the lid is used to seal the working pot. However, this design has too many parts, resulting in high cost and difficulty of assembly. Moreover, the latch is subject to large area of friction, causing non-smooth operation. Further, the steel bead is positioned by the elastic force of the spring which may deteriorate during long term use, resulting in high possibility of latch release.

Chinese patent No. CN 200710005602 discloses a slow cooker comprises a housing, a container and a lid. The lid includes a gasket around an outer edge thereof and is shaped and sized to cover the opening of the container. At least one over-the-center clip is mounted to the side all of the housing, the clip being selectively engageable with the lid to retain the lid in sealing engagement with the container, in order to inhibit leakage of the food stuffs from the interior of the container. The clip includes a hook and a lever, the hook being selectively engageable with the lid to selectively retain the lid in sealing engagement with the container. A catch has to be provided to the lid in order to engage the hook of the clip. This will lead to additional cost and more complicated manufacturing process for mounting such a catch, particularly on a glass lid as predominately used in slow cookers.

BRIEF SUMMARY OF THE INVENTION

One object of the present invention is to provide a slow cooker which involves sealing engagement of a lid and a liner container for preventing spillage of liquid content in the container.

In order to achieve the object, a slow cooker is provided comprising a cooking body having a hollow cavity, a liner container received in the hollow cavity, a lid selectively engageable with the liner container, and a locking assembly for locking the lid with the cooking body. The locking assembly is hinged at one side of the cooking body at one end and selectively engaged with an opposite side of the cooking body at the other end, with the locking assembly being disposed above the lid.

The locking assembly includes an upper part, a reset spring, and a level lock. The upper part is hinged to one side of the cooking body at one end. The level lock is hinged to the upper part at its middle portion. The reset spring is disposed in a spring mounting slot on the upper part with the top end of the reset spring resisting against one end of the level lock. The other end of the level lock is provided with a hook which is selectively engaged with a catch provided on the cooking body in order to fasten the locking assembly with the cooking body, such that the lid is locked to the cooking body.

A lower part is provided below the upper part, defined there between is a chamber used as the spring mounting slot for mounting the reset spring. The reset spring is disposed within the chamber with the top end thereof resisting against one end of the level lock.

The level lock has a protruded button extending from which towards to the cavity is a rib. Protruded position limiting ribs are provided on the lower part corresponding to the rib. The reset spring is set on the rib at one end and restricted by the position limiting ribs at the other end.

The upper and lower parts are fastened to each other by buckles or screws.

The upper part has an upper hole and the lower part has a lower hole. When the upper and lower parts are engaged, the upper and lower holes will form a through hole for the passage of the lid handle while locking the lid with the cooking body.

The rotation shaft of the upper part is hinged to the shaft hole of the cooking body or the shaft hole can be provided to the upper part and the rotation shaft can be provided to the cooking body for achieving the engagement.

A pinhole is disposed in the middle of the level lock and a mounting hole is correspondingly provided on the upper part. A pin penetrates through the mounting hole and the pinhole to hinge the level lock on to the upper part. Alternatively, the level lock is hinged to the shaft hole of the upper part through the rotation shaft. Alternatively, the level lock is hinged to the rotation shaft of the upper part at one end through the shaft hole.

A guiding surface is provided in front of the catch.

An opening is provided at one side of the shaft hole for disengagement of the rotation shaft with a non-circular shape. A suspension hook is provided to the cooking body for engagement with the locking assembly. A sealing ring is disposed at the contacting surface between the lid and the cooking body.

The lid and the liner container of the present slow cooker can form effective sealing engagement there between. The lid therefore can not slide off during transportation of the cooker and the liquid content in the container can be effectively prevented from spillage even been subject to shaking. The present slow cooker has novel structures which is very convenient to operation. The slow cooker also has stable performance and high safety.

BRIEF DESCRIPTION OF THE DRAWINGS

Further advantages and details of the present invention emerge from the example embodiments described below, which do not limit the invention in any way, and from the drawings, in which.

Figure 1:
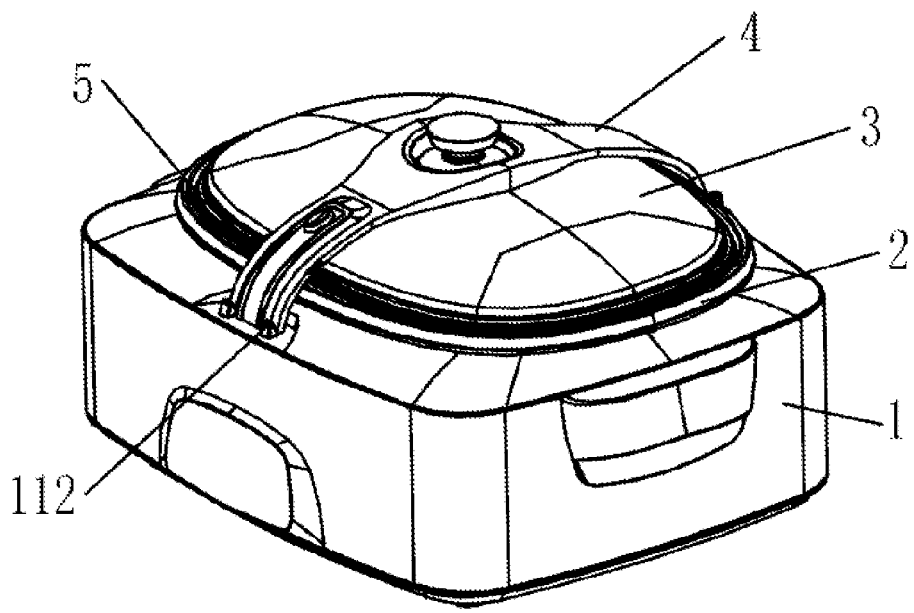
FIG. 1 is a schematic view of the structure of a slow cooker according to one embodiment of the present invention.

Elements or parts that are irrelevant with the spirit of the present invention are omitted from the drawing for clarity purpose.

DETAILED DESCRIPTION OF THE INVENTION

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" include any and all combinations of one or more of the associated listed items. It will be further understood that the terms "comprises" "comprising" "includes" and/or "including" when used herein, specify the presence of stated features, integers, steps, operations, elements, and/or components, but do not preclude the presence or addition of one or more other features, integers, steps, operations, elements, components, and/or groups thereof.

A slow cooker according to one example of the present invention is shown in FIG. 1. The slow cooker comprises a cooking body 1, a liner container 2, a lid 3, a locking assembly 4 and a sealing ring 5. The liner container 2 is placed in a hollow cavity of the cooking body 1. The lid 3 is disposed on the liner container 2 and covers the opening of the liner container 2. The sealing ring 5 is disposed around the outer edge of the lid 3. The locking assembly 4 is disposed above the lid 3 and has a rear end (as shown at right side in the drawing) hinged to the rear part of the cooking body by a rotating shaft 411 and a front end (as shown at left side in the drawing) selectively engaged with the front part of the cooking body to restrict the movement of the lid 3.

Figure 2:
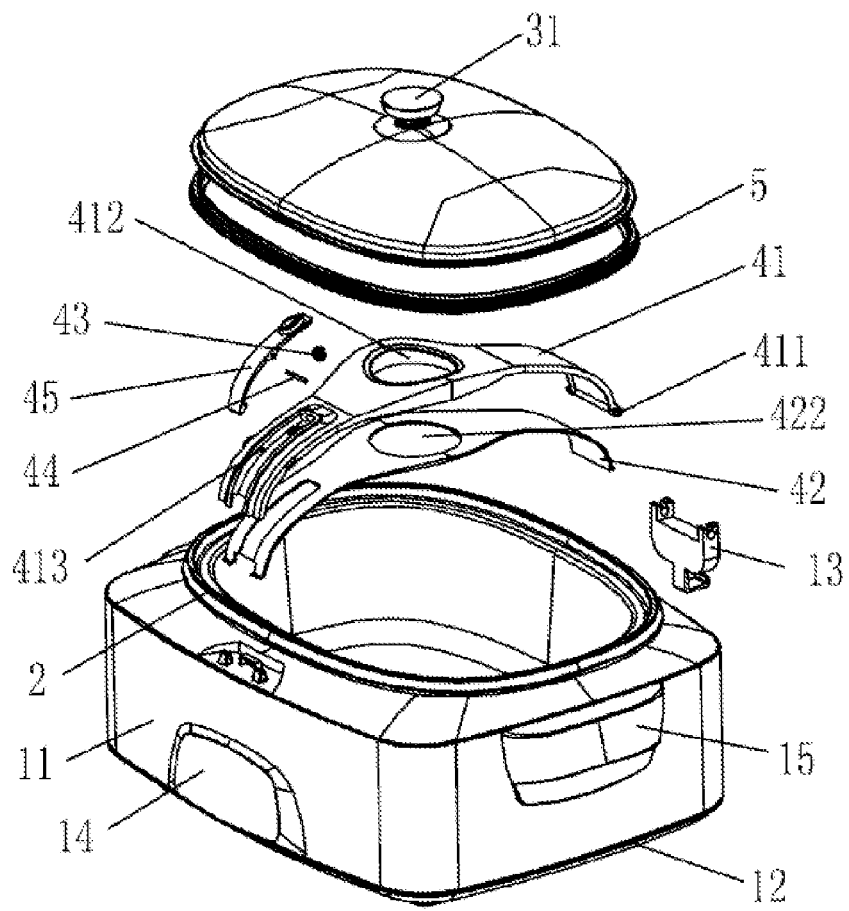
FIG. 2 is an exploded view of a slow cooker according to one embodiment of the present invention.

As shown in FIG. 2, the cooking body 1 includes a housing 11, a base 12, a shaft seat 13, a control panel 14, a handle 15, and an outer container (not shown as being blocked by the liner container 2). The base 12 is disposed under the housing 11 and the outer container is placed in the housing. The housing 11, the base 12 and the outer container define a confined space for accommodating and protecting internal functional elements such as control circuit, heating elements, and etc.

In the present example, the locking assembly 4 includes an upper part 41, a reset spring 43, and a level lock 45. The upper part 41 is hinged to one side of the cooking body at one end. The level lock 45 is hinged to the upper part 41 at its middle portion. The reset spring 43 is disposed in a spring mounting slot on the upper part 41 with the top end of the reset spring 43 resisting against one end of the level lock 45. The other end of the level lock 45 is provided with a hook 454 which is selectively engaged with a catch 111 provided on the housing 11 in order to fasten the locking assembly with the cooking body, such that the lid 3 is locked to the cooking body.

Figure 9:
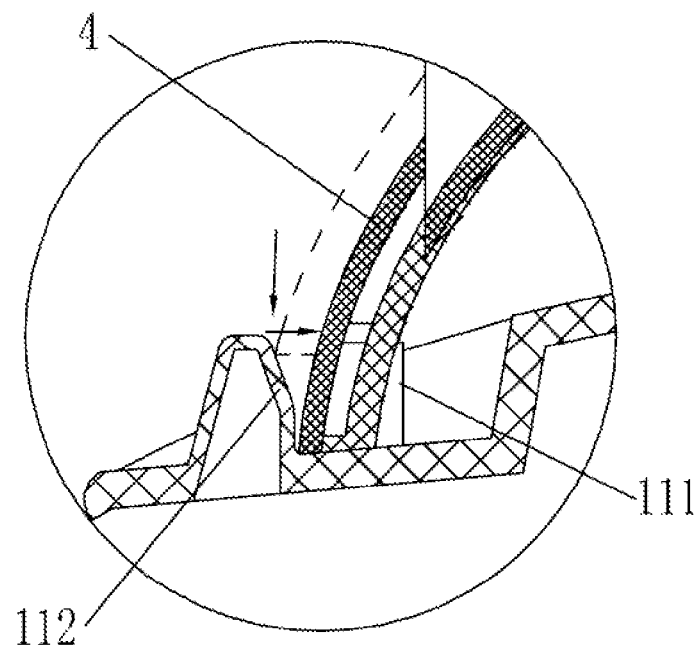
FIG. 9 shows an enlarged sectional view of the locking area of the cooking body of a slow cooker, according to one embodiment of the present invention.

To facilitate the engagement between the hook 454 and the catch 111, both are designed to have an inclined surface in relation to horizontal plane. As shown in FIG. 9, a guiding surface 112 is provided in front of the catch 111 such that when the length of the locking assembly 4 is increased due to such as environmental factors, and due to the exist of the guiding surface, the locking assembly 4, when pressed, will return to its inherent length as shown as dotted line in FIG. 9, so as to obtain a sufficient engagement length between the hook 454 and the catch 111 in order to ensure reliable engagement.

In addition, below the upper part 41 is provided with a lower part 42, defined therebetween is a chamber used as the spring mounting slot for mounting the reset spring 43. The reset spring 43 is disposed within the chamber with the top end thereof resisting against one end of the level lock 45.

Further, the level lock 45 has a protruded button 451 extending from which towards to the cavity is a rib 452. Protruded position limiting ribs 421 are provided on the lower part corresponding to the rib 452. The reset spring 43 is set on the rib 452 at one end and restricted by the position limiting ribs 421 at the other end. The reset spring 43 can extend/retract during the rotation of the level lock 45.

In the example, the upper and lower parts 41, 42 are fastened to each other by buckles or screws.

Additionally, the upper part 41 has an upper hole 412 and the lower part 42 has a lower hole 422. When the upper and lower parts are engaged, the upper and lower holes 412, 422 will form a through hole for the passage of the lid handle 31 while locking the lid with the cooking body 1.

In the present example, the rotation shaft 411 of the upper part 41 is hinged to the shaft hole 131 of the cooking body 1. Alternatively, the shaft hole can be provided to the upper part 41 and the rotation shaft can be provided to the cooking body 1 for achieving the engagement.

In the present example, a pinhole 453 is disposed in the middle of the level lock 45 and a mounting hole 413 is correspondingly provided on the upper part 41. A pin 44 penetrates through the mounting hole 413 and the pinhole 453 to hinge the level lock 45 on to the upper part 41. Alternatively, the level lock 45 is hinged to the shaft hole of the upper part 41 through the rotation shaft. Alternatively, the level lock 45 is hinged to the rotation shaft of the upper part 41 at one end through the shaft hole. As shown in FIGS. 2 to 5, the level lock 45 is rotatable within certain angel ranges.

Figure 6:
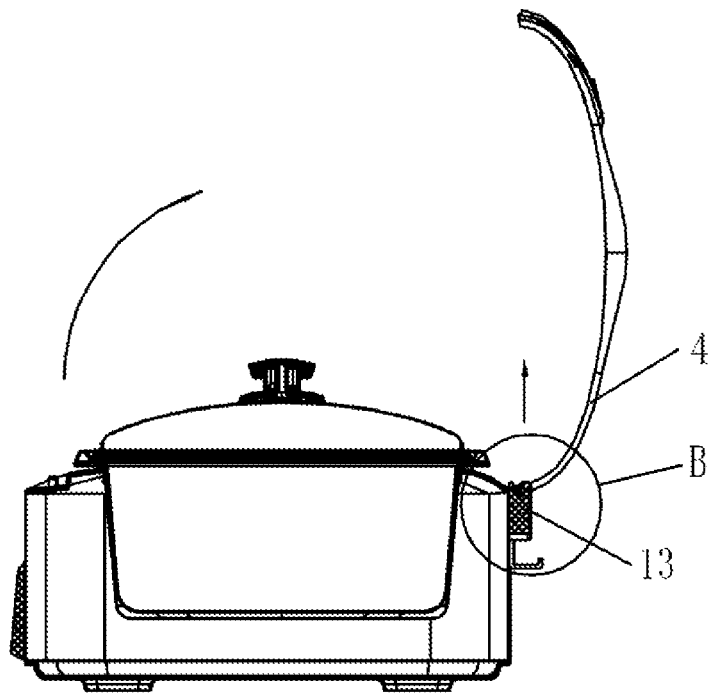
FIG. 6 is a section view of a slow cooker in which the locking assembly is rotated by a certain angle, according to one embodiment of the present invention.
Figure 7:
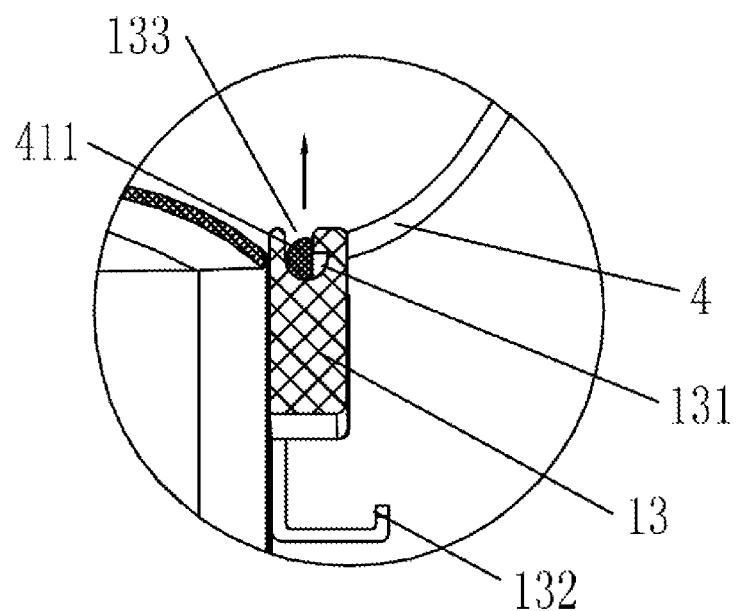
FIG. 7 is an enlarged view of portion B in FIG. 6.
Figure 8:
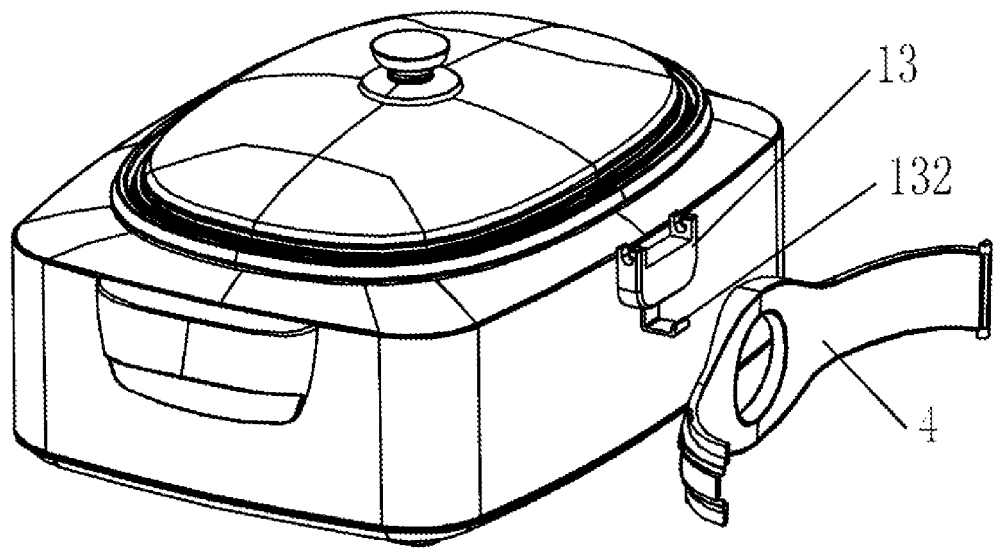
FIG. 8 shows a slow cooker in which the locking assembly is removed from the cooking body, according to one embodiment of the present invention.

In the example, an opening 133 is provided at one side of the shaft hole 131 for release of the rotation shaft 411 with a non-circular shape. A suspension hook 132 is provided to the cooking body 1 for engagement with the locking assembly 4. The sealing ring 5 is disposed at the contacting surface between the lid 3 and the cooking body 1. The rotation shaft 4 can be in a non-circular shape including semi-circular shape or D shape. In the present example, a semi-circular shape rotation shaft is provided as shown in FIGS. 6 and 7. The shaft hole 131 is provided at the shaft seat 13 and has a larger diameter than that of the opening 133.

Figure 10:
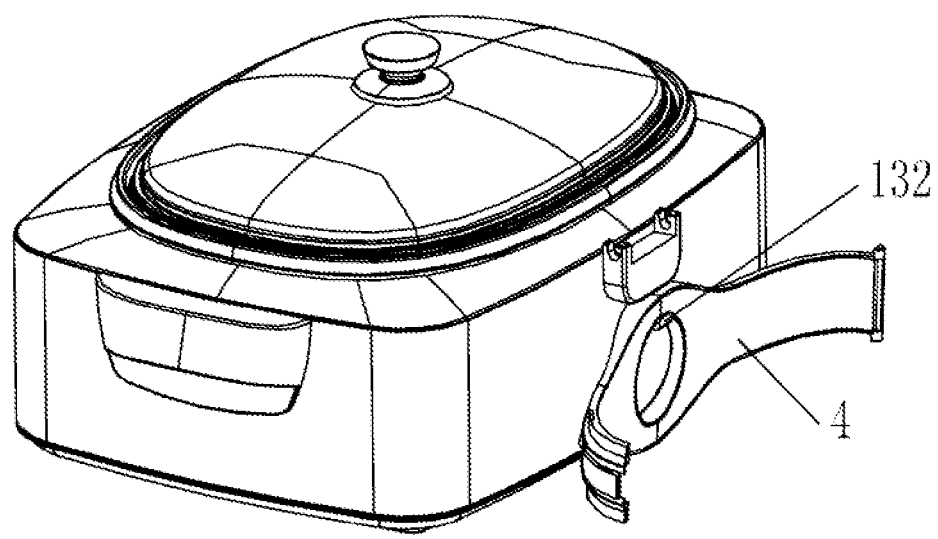
FIG. 10 shows a slow cooker in which the locking assembly is removed from the cooking body and hangs on a suspension hook of the cooking body, according to one embodiment of the present invention.

When the locking assembly 4 is rotated to lock the lid and the cooking body 1, it is restricted within the shaft hole 131 and unable to disengage there from. When the locking assembly 4 is upright disposed or at a certain angle with respect to the lid (unlock state), the rotation shaft 411 is accessible to the shaft hole 131 through the opening 133. In other words, the rotation shaft at unlock state can be separated from the cooking body, which facilitates accessibility of the lid 3 or the liner container. As shown in FIG. 10, the rotation shaft 411 when disengaged from the cooking body 1 can be suspended on the suspension hook 132 by virtue of the through hole at the middle portion thereof to save space and reduce the possibility of loss.

The locking and unlocking operation of the lid 3 and the cooking body 1 is described in detail as follows.

Figure 3:
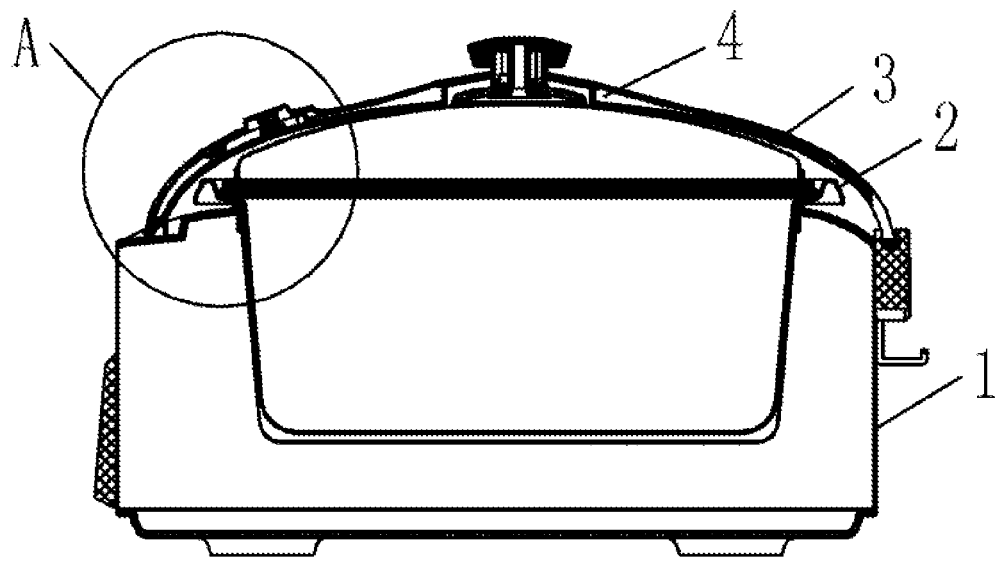
FIG. 3 is a sectional view of a slow cooker in which the lid is locked, according to one embodiment of the present invention.
Figure 4:
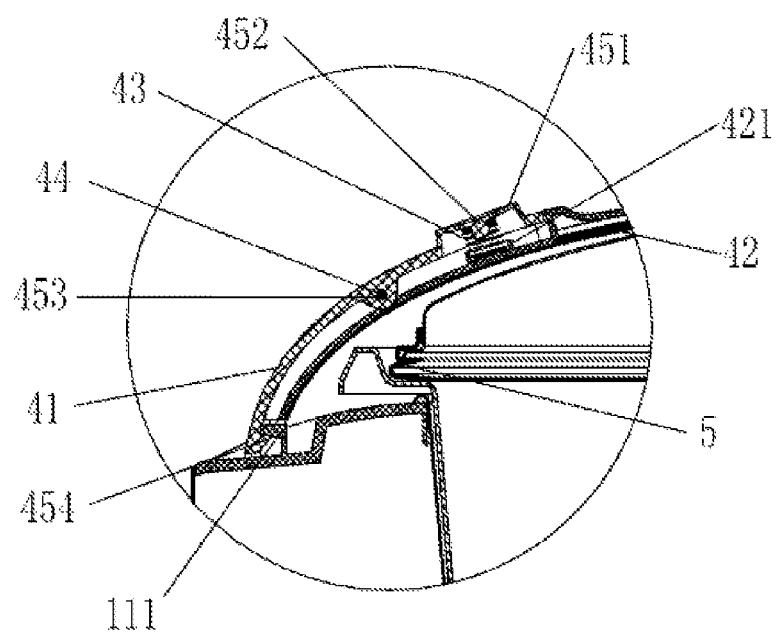
FIG. 4 is an enlarged view of portion A in FIG. 3.

As shown in FIGS. 3 and 4, when in lock state, the locking assembly 4 is disposed above the lid 3. The locking assembly 4 is fastened with the shaft hole 132 at the rear end and engaged with the catch 111 through the hook 454 at the front end. The reset spring 43 enables the hook 454 to lock with the catch 111. In this case, the locking assembly 4 compresses the lid 3, and the sealing ring 5 is compressed such that the liner container, the lid and the sealing ring 5 defines a sealing space to prevent spillage of any liquid content in the liner container and prevent the lid from sliding off.

Figure 5:
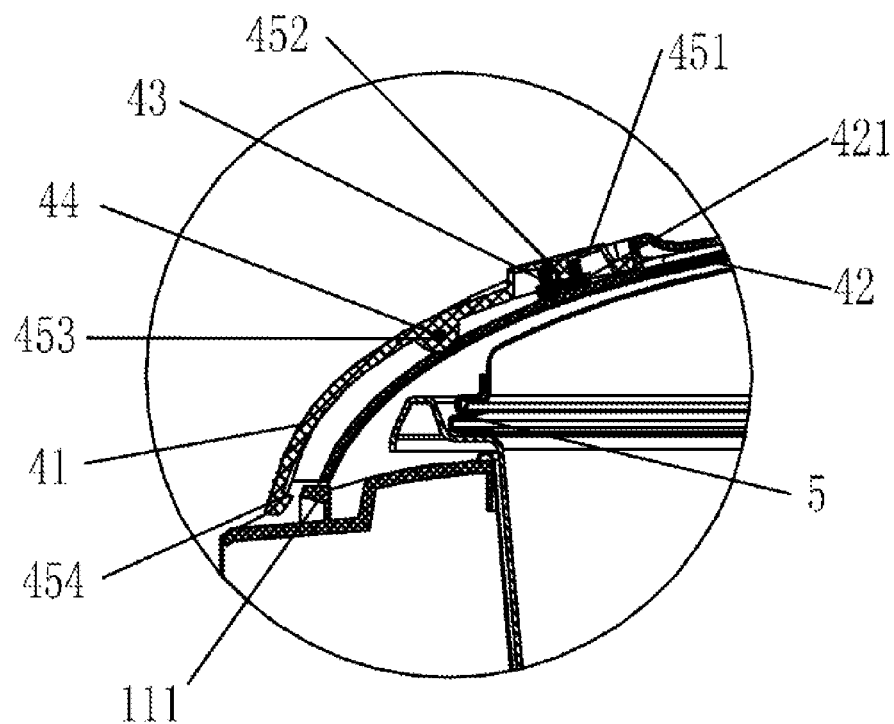
FIG. 5 is an enlarged view of portion A in FIG. 3 when the lid is unlocked.

As shown in FIG. 5, when the button 451 at the distal end of the level lock 45 is pressed down, the reset spring 43 will be compressed to move downward. The level lock 45 will start to rotate due to leveraging effect of the pin 44 in order to move the hook 454 forward and release from the catch 111. In this case, the locking assembly 4 can rotate in the direction shown by the arrow in FIG. 6. The lid 3 will not be subject to compression and can be picked up to open.

The present invention provides a slow cooker with novel structures which is very convenient to operation. The slow cooker also has stable performance and high safety.

It should be understood that various example embodiments have been described with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

What is claimed is:

1. A slow cooker, comprising:
a cooking body having a hollow cavity;
a liner container received in the hollow cavity;
a lid selectively engageable with the liner container; and
a locking assembly for locking the lid with the cooking body, wherein
the locking assembly is hinged at one side of the cooking body at one end and selectively engaged with an opposite side of the cooking body at the other end, with the locking assembly being disposed above the lid,
wherein the locking assembly includes an upper part, a reset spring, and a level lock, the locking assembly being hinged to the one side of the cooking body through the upper part, the level lock being hinged to the upper part at a middle portion of the level lock, the reset spring being disposed in a spring mounting slot on the upper part with a top end of the reset spring resisting against one end of the level lock, the other end of the level lock being provided with a hook which is selectively engaged with a catch provided on the cooking body.

2. The slow cooker of claim 1, wherein a lower part is provided below the upper part, and a chamber is defined between the upper and lower parts for use as the spring mounting slot, the reset spring being disposed within the chamber.

3. The slow cooker of claim 2, wherein the level lock includes a protruded button having a rib extending towards the chamber, protruded position limiting ribs being provided on the lower part corresponding to the rib, the reset spring being set on the rib at one end and restricted by the position limiting ribs at the other end.

4. The slow cooker of claim 2, wherein the upper and lower parts are fastened to each other by buckles or screws.

5. The slow cooker of claim 2, wherein the upper part has an upper hole and the lower part has a lower hole, and when the upper and lower parts are engaged, the upper and lower holes form a through hole for passage of a lid handle while locking the lid with the cooking body.

6. The slow cooker of claim 1, wherein a rotation shaft of the upper part is hinged to a shaft hole of the cooking body, or alternatively, a shaft hole is provided to the upper part while a rotation shaft is provided to the cooking body.

7. The slow cooker of claim 6, wherein a pinhole is disposed in the middle of the level lock and a mounting hole is correspondingly provided on the upper part, a pin penetrating through the mounting hole and the pinhole to hinge the level lock onto the upper part, or alternatively, the level lock being hinged to the shaft hole of the upper part through the rotation shaft, or alternatively, the level lock being hinged to the rotation shaft of the upper part at one end through the shaft hole.

8. The slow cooker of claim 7, wherein a guiding surface is provided on the cooking body at a position in front of the catch.

9. The slow cooker of claim 7, wherein an opening is provided at one side of the shaft hole for disengagement of a non-circular rotation shaft.

10. The slow cooker of claim 7, wherein a suspension hook is provided to the cooking body for engagement with the locking assembly.

11. The slow cooker of claim 7, wherein a sealing ring is disposed at a contacting surface between the lid and the cooking body.

* * * * *